Feb. 16, 1937. C. I. JUSTHEIM 2,070,905
INSULATED FOOD CONTAINER
Filed April 10, 1934
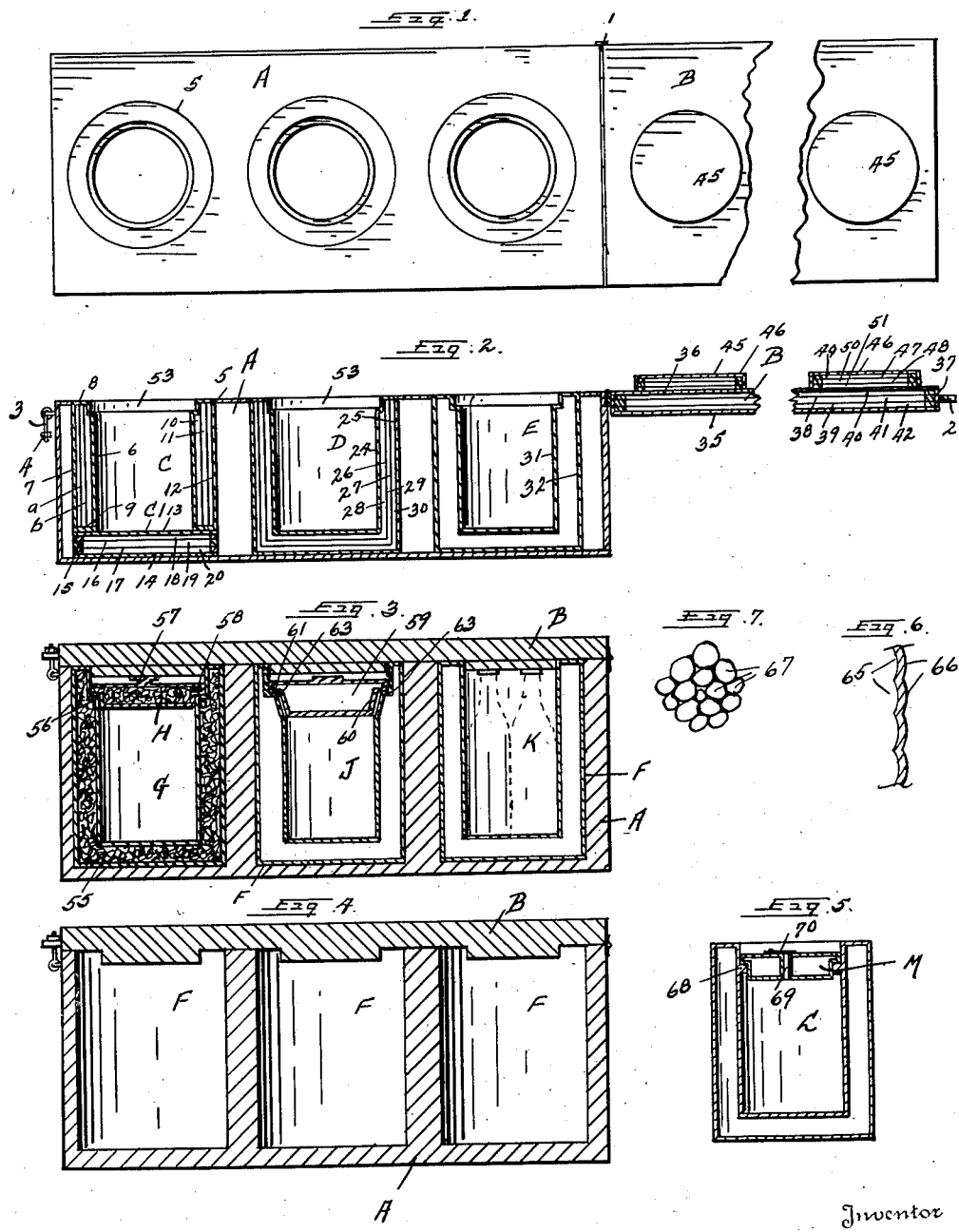
Inventor
Clarence I Justheim
By R. M. Thomas
Attorney Patented Feb. 16, 1937

2,070,905

UNITED STATES PATENT OFFICE 2,070,905

INSULATED FOOD CONTAINER

Clarence I. Justheim, Salt Lake City, Utah

Application April 10, 1934, Serial No. 719,817

5 Claims. (Cl. 220—16)

My invention relates to insulated containers for foods and ice cream or frozen confections or cold drinks and has for its object to provide a new and efficient device for carrying both hot and cold foods in the same container, but in separate compartments, so that neither the hot nor the cold food contacts or in any way changes the temperature of the other foods in the container.

A further object is to provide a food and drink container which will keep either foods or liquids, either hot or cold, in the same container, but in separate chambers thereof, so that the user may carry both hot and cold foods or drinks in the one container.

A still further object is to provide a container having one common lid with a common base carrying several chambers therein, each chamber to carry either hot or cold foods or drinks and with separate closure blocks formed on the under side of the lid so that the common lid will close all of the chambers with each container closed by its closure blocks, but the common lid closing the entire upper surface of the container.

A still further object is to provide insulated chambers in a common base the chambers being either removable or stationary in said base, and having a common lid to cover all chambers but having each chamber provided with an insulated lid separate and apart from the common lid so that when the common lid is raised the compartments may still be kept closed and insulated if desired, only one chamber being opened as desired.

A still further object is to provide a container for food or drink chambers, with each chamber insulated with suitable insulation such as sheets of highly polished aluminum spaced apart by dead air spaces.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a plan view of the container with the lid thrown back and parts cut away from the lid.

Figure 2 is a vertical section of the device.

Figure 3 is a vertical section of a modified form of the device.

Figure 4 is a vertical section of the container with the chambers removed.

Figure 5 is a view of one of the removed food or drink chambers showing the separate lid therefor.

Figure 6 is a sectional view of a sheet of the highly polished aluminum enlarged greatly to show the facets therein.

Figure 7 is a face view of a sheet of aluminum showing a peened or irregular surface therefor.

In the drawing I have shown the casing of the container as a rectangular body A, having a lid B therefor of the same dimensions to fit entirely over the casing A and cover it. The lid is preferably hinged to the casing body A by a hinge 1 and an eye 2 is provided in the free end of the lid to be engaged by the bolt 3 secured to the casing A with the nut 4 to screw the eye 2 down to lock the lid to the body.

The rectangular body A has openings 5 in the top side thereof in which the food chambers are carried.

The food chamber C as shown in Figure 2 consists of an insulated cylindrical chamber made with the inner cylindrical wall 6 joined to the outer wall 7 by an annular closure plate 8 for the top end and on the bottom by a like annular plate 9. This forms the cylindrical chamber and between the walls of this chamber I provide my insulation medium. In this particular chamber C the insulation consists of annular sheets $a$ and $b$ of very thin aluminum set into the space between the two walls and spaced apart by dead air spaces 10 and 11 and 12 by imbedding the edges of the aluminum in suitable elements. The bottom for this chamber consists of a flat round plate C1 formed of top wall 13 and bottom wall 14 spaced apart by an annular ring 15 and said ring carrying sheets of very highly polished thin aluminum 16 and 17 therein set apart by dead air spaces 18, 19, and 20. The annular chamber is set onto the top side of this plate C1 to form the food chamber and suitable sealing means are employed to seal the chamber to the plate.

In the type of food chamber shown as D in Figure 2 the chamber is made by forming an inner wall 24 and an outer wall 25 into the chamber form with cylindrical walls and flat closed bottom, with the wall 25 of larger diameter than the wall 24. Between these two walls I then provide my insulation which consists of sheets of very thin aluminum 26 and 27 set apart by dead air spaces 28, 29, and 30, with suitable means employed to hold the sheets of aluminum spaced apart.

The chamber E is made of like construction to that of the chamber D, except that the walls 31 and 32 are formed of glass covered with the proper reflecting surface material such as used in thermos bottles and no other insulation is used. This particular chamber uses the thermos bottle principle, to keep the temperature as near constant as possible.

The lid B for the casing is formed of a top sheet 35 and bottom sheets 36, spaced apart by the flange edge 37 and in the space between the sheets there are sheets of very thin aluminum 38 and 39 spaced apart by dead air spaces 40, 41, and 42. Onto the bottom side of the lid B I provide a closure plug 45 consisting of a cup shaped member 46 carrying sheets of spaced apart very thin aluminum 47 and 48 therein with the dead air spaces 49, 50, and 51 spacing the aluminum apart and with the cup member 46 to be secured to the under side of the lid by suitable means. The lid is adapted to close the casing A with the plugs 45 to fit into the open end of the chambers and each chamber is provided with, either the same diameter as the diameter of the plugs 45, or with a step 53 in the upper end thereof into which the closure plugs 45 fit, to completely close and insulate the chambers from each other, and from the outside.

The casing A may be made with a dead air space surrounding each chamber as in Figure 1 or may be made with some insulation material therein or of solid material as shown in Figure 3. The sockets F in Figure 3 form the positions for the chambers and each chamber may be made for a specific purpose as shown in Figure 3. The first chamber G may be for foods and is made either with thin sheets of aluminum as shown in Figure 1, chamber C or D, or may be made as chamber E, or, as shown, with any suitable insulation material 55 carried therein, such as cork, wool, or other similar materials. This chamber G is provided with a closure lid E therefor, said lid to fit into a flange 56 in the chamber with a handle 57 by which it may be removed and with the lid provided with a flange 58 to fit into the chamber to seal it, and the lid may be made like the cups of the lid B or may be filled with cork, wool, or such material as shown in the chamber G. In the chamber J the lid 59 is formed with a depending sloping portion 60 to fit a like portion in the chamber with suitable gasket therebetween. This chamber may be for liquids and the flange 61 of the lid screws into threads in the chamber J above the step 63 therein. The chamber K is shown carrying bottled goods in dotted line, but may be used to carry any food or drink, but this container is not shown with a lid in use when bottled goods are carried therein, the idea being that the depression on the lid B will engage the top of the bottle and prevent motion thereof.

In Figures 3 and 4 the lid B is shown of some solid construction, but the type of lid shown in Figure 2 may be used on the type of casing shown in these other figures if desired.

In Figure 5 I have shown a chamber L removed from the socket F, said chamber being formed of the vacuum type similar to the thermos bottle principle.

The lid M used in the chamber L sets upon a step 68 formed on the inner wall of the chamber. This chamber may be used for many purposes and the lid M is provided with a vent port 69 therethrough to provide for escapement of gases or steam if necessary and a closure plate 70 is pivotally secured to the lid M to provide means to close the port if desired. The lid B may be provided with a similar vent to allow for escapement of gas or steam passing through the port 69 if necessary.

In Figure 6 I have shown a magnified sectional view of a portion of the very thin aluminum sheets used for insulation and I have there shown the faces of the sheet as made with one side of concave facets 65 and the other side convex facets 66 with the concave facets to concentrate the rays of light and heat or cold which encounter this face and the convex facets to diffuse any heat or cold which may encounter this side, or the opposite principle will also apply where heat is within the container and it is desired to keep the cold out.

In Figure 7 I have shown the face view of the insulation of this aluminum where the surface is formed of peened facets 67, some of which will be concave and some convex in form.

Having thus described my invention I desire to secure by Letters Patent and claim:

1. In a device of the class described the combination of a casing having sockets formed therein; an insulated lid for said casing; separate food chambers to fit into said sockets but removable therefrom, said chambers being formed of inner and outer walls spaced apart carrying sheets of very thin aluminum foil there between, having the surfaces of the foil formed of convex and concave facets and a lid for each food chamber of top and bottom walls spaced apart and carrying thin sheets of very thin aluminum foil there between, having the surfaces of the foil formed into convex and concave facets.

2. In a food and drink carrying device, the combination of a casing; means to insulate said casing; sockets in the casing spaced apart one from the other and from the sides of the casing; removable double walled insulated containers to be inserted into each socket with the insulation of each container consisting of highly reflective metal foils spaced apart and spaced from the walls of the container with the foil formed of concave facets on the inward side and convex facets on the outer side to concentrate the heat or cold within the container, and diffuse the heat or cold from outside the container, substantially as described.

3. In a food and drink container, a multiplicity of openings in the top of an insulated casing; separate food containers for each opening adapted to be inserted therein while being carried but, to be removed therefrom for serving, said containers being formed of double walls spaced apart and carrying a partial vacuum therebetween with the walls coated with highly reflective material; separate covers for each food container insulated in a like manner; and a cover for the entire casing to lock all of the containers therein while being transported.

4. In a food and drink container, the combination of a casing having openings therein; means to insulate said casing; separate removable food containers to fit into said sockets, said food containers being made of double walls with partial vacuum therebetween and with the walls formed of highly reflective material; an annular flange formed within each container; a lid to fit down into each container onto said flange, said lid being formed of double walls carrying partial vacuum therein and with the walls of highly reflective material with a port through one of the lids for carrying hot fluids to allow for escapement of steam therefrom; and a spring valve secured over said port to hold the steam in the container to a predetermined pressure required to raise the springs; and a cover for the entire casing having individual closure plugs formed on the bottom side thereof to fit into each container top above the individual lids.

5. In a device of the class described, the combination of a casing having sockets formed therein; an insulated lid for said casing; separate food chambers to fit into said sockets but removable therefrom, said chambers being formed of inner and outer walls spaced apart carrying sheets of very thin aluminum foil therebetween, having the surfaces of the foil formed of convex and concave facets with the sheets so spaced and secured that the radii of the concave facets will be inwardly toward the center of the food chamber to concentrate the heat within the container; and a lid for each food chamber composed of top and bottom walls, spaced apart and carrying thin sheets of very thin aluminum foil therebetween, having the surfaces of the foil formed into concave and convex facets.

CLARENCE I. JUSTHEIM.